United States Patent
Li et al.

(10) Patent No.: US 7,693,301 B2
(45) Date of Patent: Apr. 6, 2010

(54) KNOWN FACE GUIDED IMAGING METHOD

(75) Inventors: Shu Li, Hangzhou (CN); Jin Wang, Hangzhou (CN)

(73) Assignee: ArcSoft, Inc., Fremont, CA (US)

( * ) Notice: Subject to any disclaimer, the term of this patent is extended or adjusted under 35 U.S.C. 154(b) by 847 days.

(21) Appl. No.: 11/545,423

(22) Filed: Oct. 11, 2006

(65) Prior Publication Data

US 2008/0089560 A1    Apr. 17, 2008

(51) Int. Cl.
*G06K 9/00* (2006.01)
(52) U.S. Cl. ...................... 382/103; 382/118
(58) Field of Classification Search .......... 382/100, 382/103, 118, 155–159, 170, 181, 216, 225, 382/285–286, 299, 154, 107; 706/2–16; 700/47–48; 348/154; 345/475
See application file for complete search history.

(56) References Cited

U.S. PATENT DOCUMENTS 6,671,391 B1 * 12/2003 Zhang et al. ............... 382/118

OTHER PUBLICATIONS

Demirkir et al. (AVBPA 2005, LNCS 3546 pp. 339-345, 2005, Springer-Verlag, Cem Demirkur and Bulent Dankur, Dept. Electrical-Electronic Engineering Bogazici University) disclose Using Look-Up Table Based Gentle Adaboost.*

* cited by examiner

*Primary Examiner*—Samir A. Ahmed
*Assistant Examiner*—Mehdi Rashidian
(74) *Attorney, Agent, or Firm*—Bacon & Thomas, PLLC

(57) ABSTRACT

A known face guided imaging method applied for an electronic imaging device uses the scale of a known face sensed in a previous frame to define a scale range of a searching window, which adds a scale constraint into the searching window so as to search a current frame horizontally and vertically in the searching window to perform a face searching loop for a face. The invention simply sends a corresponding image patch within the scale range to a face detector for the face detection, and the searching space is constrained in a small group of scale ranges without the need of detecting the whole image of various different scales within the scale range, and thus the invention effectively reduces the huge quantity of computing values required for the detection process and greatly enhances the speed and efficiency of the face detection.

10 Claims, 7 Drawing Sheets

KNOWN FACE GUIDED IMAGING METHOD

FIELD OF THE INVENTION

The present invention relates to a known face guided imaging method, and more particularly to a known face guided imaging method capable of reducing the huge quantity of computing values required for a face detection and effectively enhancing the speed and efficiency of the face detection.

BACKGROUND OF THE INVENTION

As the digital imaging technology advances rapidly in recent years, various electronic devices (such as digital cameras, camcorders, notebook computer, and mobile phone, etc) with installed digital imaging components (such as CCD and CMOS, etc) are introduced constantly to the market. Not only the quality becomes higher, but the size or volume of products also becomes less, and thus their price becomes lower gradually. These digital imaging devices available in the market is getting increasingly popular, and many digital imaging devices are equipped with advanced functions such as auto focus and auto exposure. However, image information can be obtained after a whole scene is sensed to determine whether or not to capture the image information, and a face only occupies a small portion of the whole scene, and thus a novice having little experience and skill of properly adjusting the shutter and diaphragm cannot capture satisfactory and praised images. Therefore, finding a way of designing an electronic imaging device with a smart imaging function to meet the photographic requirements of consumers, compensating the consumers' insufficient skills of taking a picture, effectively saving the long adjusting procedure and time, and taking high-quality images becomes an important subject for electronic imaging device designers and manufacturers.

To achieve an electronic imaging device with a smart imaging function and capable of taking high quality images, some manufactures have applied face detection technologies to the new types of electronic imaging devices, wherein the algorithm for detecting a face has been disclosed many publications, and the most popular one is the face detector designed according to a Gentle Adaboost (GAB) algorithm, and the face detector uses a Haar-like feature to identify a face and a specific quantity of face pattern samples to train a required face classifier to determine which image of the scene belongs to (or not belongs) to a face, so as to detect a face in the image and provide a quick identification. Traditionally, the computing rules of the GAB algorithm are listed as follows:

| A stage of Haar feature classifier construction using GAB |
|---|
| 1. Start with weights $w_i = 1/2p$ and $1/2l$ where p and l are the number of positive and negatives class samples. |
| 2. Repeat for m = 1, 2, . . . , M. <br> (a) For each Haar feature j, $f_m(x) = P_w(y=1\|x) - P_w(y=-1\|x)$ using only the feature j values. <br> (b) Choose the best feature confidence set of values $f_m(x)$ giving the minimum weighted error $e_m = E_w [1_{(y_i \neq sign[f_m(x_i)])}]$ for all feature j. <br> (c) Update $F(x) \leftarrow F(x) + f_m(x)$ <br> (d) Set $w_i \leftarrow w_i \exp[-y_i f_m(x_i)]$, $i = 1, 2, \ldots, N$, and renormalize so that $\sum_i w_i = 1$. |
| 3. Output the classifier sign $[F(x)] = \text{sign}\left[\sum_{m=1}^{M} f_m(x)\right]$. |

The GAB algorithm chooses the best Haar feature having the minimum weighted error $e_m$ from all features. For each weak classifier $f_m(x)$, the GAB algorithm chooses a feature j, and the error function is minimized by Equation 1:

$$f_m(x) = \operatorname*{argmin}_{j}\left\{\sum_i w_i * v_i\right\} \quad (1)$$

where $$v_i = \begin{cases} 1 = \text{(missclassified)} \\ 0 = \text{other} \end{cases},$$

$w_i$ is a sample weight.

Therefore, the foregoing table and Equation 1 show that although the GAB algorithm updates the classifier at each stage by a confidence-rated real value, the misclassification error defined in the GAB algorithm is discrete. In Equation 1, $v_i$ is a Boolean variable which is equal to 1 if $v_i$ is computed for misclassification, and equal to 0 if $v_i$ is computed for classification. As we know that, a weak classifier with a binary output in the discrete Adaboost algorithm cannot show a Haar-like feature being situated at a very good distribution status. Similarly, the misclassification error defined in the algorithm is insufficient to describe the distribution status of the misclassification error precisely.

In view of the description above, the inventor of the present invention redefines the misclassification error em in the GAB algorithm as follows:

$$e_m = \sum_i w_i * v_i = \sum_i w_i * (y_i - f_m(x_i))^2 \quad (2)$$

where, $v_i$ stands for the distance between a confidence-rated real value and an expected class label. According to an Audio- and Video-based Biometric Person Authentication's paper "Face Detection Using Look-up Table Based Gentle Adaboost" authored by Cem Demirkir and Bulent Sankur, if $f_m(x_i)$ falls within a variable range of $[-1, 1]$, $v_i$ will be a real variable distributed in the variable range of $[-2, 2]$, and such definition can describe a misclassification error in a confidence form and compute the misclassification error by the method of a histogram bin in a computer programming. In two histogram bins as shown in FIG. 1, the two histogram bins show the difference of two defined equations, wherein positive samples in the histogram bins have different distributions for the features i and j. For simplicity the negative samples own sample distribution for feature i and j. If Equation 1 is used, then the resultant error summation will be the same for the two types of feature spaces. If Equation 2 is used, the resultant error summation of the feature will be smaller than the computed result of the feature i. As to a greedy searching scheme, feature j is selected to build the weak classifier according to the definition of a weak classifier function of the weak classifier. If it is difficult to separate the samples in a histogram bin defined in a weak classifier function, the output confidence value will be close to zero, or else the output confidence value will be close to 1 or −1. The result obviously shows that the output confidence value of the feature j is much larger than the output confidence value of the feature i. Thus, in the two histogram bins, the sample in the space of feature j can be separated from the space of feature i more easily, and thus the definition of a confidence-rated misclassification error becomes more reasonable.

Traditionally, the Haar-like feature is defined in its feature pool. Four basic units are used for detecting an object in an image window as shown in FIG. 2, wherein the prototypes 10, 11 represent edge features; the prototype 12 represents a line feature; the prototype 13 represents a special diagonal line feature; the black area represents a negative weight; and the white area represents a positive weight. However, the inventor of the present invention also discloses a way of defining a Haar-like feature according to the foregoing algorithm to separate the samples in the histogram bin more easily, and the Haar-like feature for detecting an object in an image window is defined by eight basic units as shown in FIG. 3 and called as an extended Haar feature, wherein the feature prototypes 20, 21 represent edge features; the black area represents a negative weight; the white area represents a positive weight; and the black and white areas are distributed on the same horizontal line or vertical line and separated with each other by a certain specific distance. The feature prototypes 22, 23 represent diagonal features; the black area represents a negative weight; the white area represents a positive weight; and the diagonals of the black and white areas are perpendicular with each other. The feature prototypes 24, 25 also represent diagonal feature prototypes; the black area represents a negative weight; the white area represents a positive weight; and the diagonals of the black and white areas are parallel with each other. The prototypes 26, 27 represent special diagonal line features; the black area represents a negative weight; and the white area represents a positive weight, wherein ¼ of the areas of the black area and the white area are overlapped along their diagonal directions.

Although the foregoing definition of an extended Haar feature makes the separation of samples in the histogram bin more easily, the inventor of the present invention also finds out that the following situations should be taken into consideration, when a face in a preview image is detected and recognized:

1. To detect a newly present-in unknown face in the current frame and an unknown face not detected in a previous frame, a compete detection process must be conducted for the whole image.

2. The huge quantity of computing values for completing the detection process of the whole image slows down the processing speed significantly.

3. Due to the complexity of a photographed environment for detecting a face in an image by a face detector, the non-face patterns can be rejected accurately.

4. If the factors including pose, expression and illumination are taken into consideration, for the known faces detected in a previous frame, the face detector cannot be too stringent.

Since the forgoing conditions 1 and 2 are contradictive to each other, an image having 120×160 pixels is taken for example. Traditionally, a face detector uses ten different sized searching windows to search every preview image and adjusts the size of the searching windows one by one and moves the searching windows horizontally and vertically to search a face repeatedly, and thus the computing values for such detection process is huge, and the speed and efficiency of the face detection are very low, and the performance cannot meet consumers' requirements and expectations.

SUMMARY OF THE INVENTION

In view of the traditional face detector of an electronic imaging device for searching a face in a preview image by the face detector comes with poor speed and efficiency, the inventor of the present invention based on years of experience to conduct extensive researches and experiments and finally invented a known face guided imaging method, in hope of reducing the huge quantity of computing values required by the face detection and effectively enhancing the speed and efficiency of the face detection.

Therefore, it is a primary objective of the present invention to overcome the foregoing shortcomings by providing a known face guided imaging method applied for an electronic imaging device that uses the scale of a known face sensed by a previous frame to define a scale range of a searching window, which adds a scale constraint into the searching window so as to search a current frame horizontally and vertically in the searching window to perform a face searching loop for a face. Such arrangement simply sends a corresponding image patch within the scale range to a face detector for the face detection, and thus the searching space will be constrained in a small group of scale ranges without the need of detecting the whole image with different scales within the scale range, and it also effectively reduces the huge quantity of computing values required for the detection process and greatly enhances the speed and efficiency of the face detection.

Another objective of the present invention is to build a label mask for completing the scale constraint, and the label mask has the same scale as the search image, and the area of the boundary box of the corresponding known face and the area of the remaining of the unknown face are labeled with different values, such that if the center of the searching windows falls in an area labeled for unknown faces during a face detection process, the scale constraint of the unknown face will be added. If the center of the searching window falls in an area labeled for known faces, the scale constraint of the known face will be applied.

Another objective of the present invention is to define the range of the scale constraint of the searching windows based on the range of the known face area and unknown face area on the label mask.

The above and other objects, features and advantages of the present invention will become apparent from the following detailed description taken with the accompanying drawings.

DETAILED DESCRIPTION OF THE PREFERRED EMBODIMENTS

Figure 1:
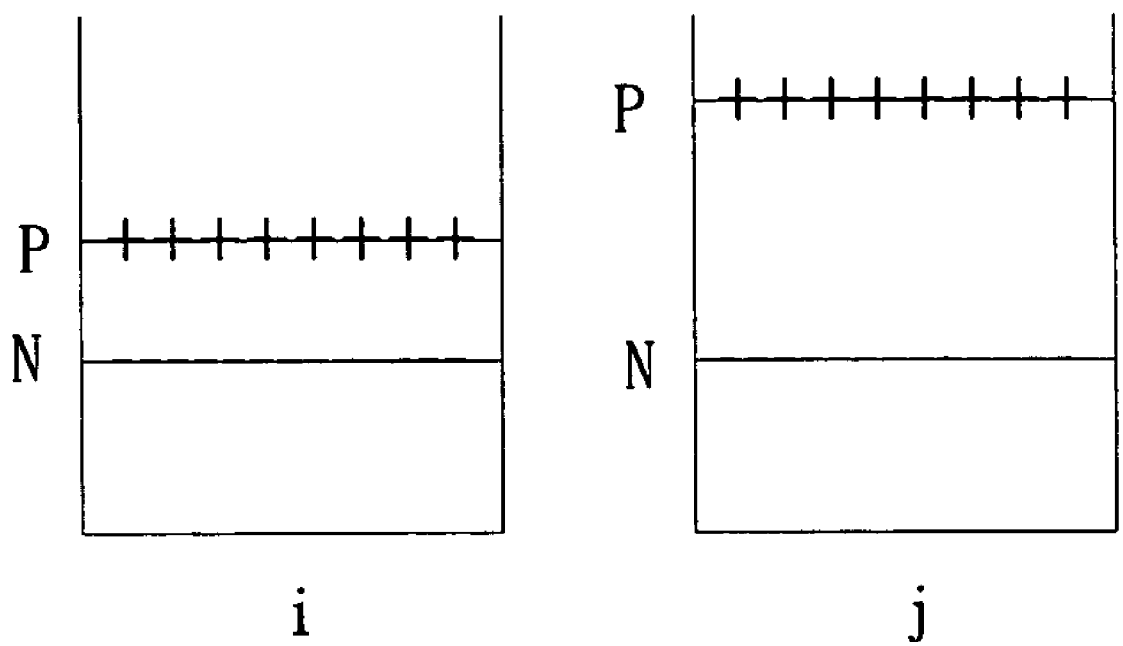
FIG. 1 is a schematic view of the distributions of the feature i and the feature j by a traditional histogram bin method.
Figure 2:
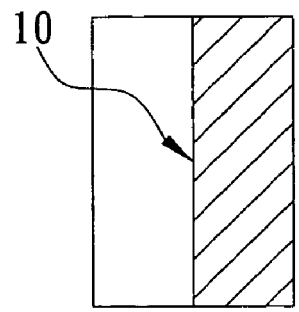
FIG. 2 is a schematic view of four basic units used for defining feature prototypes used in traditional Haar-like feature.
Figure 2:
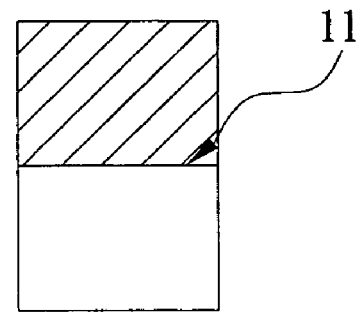
Figure 2:
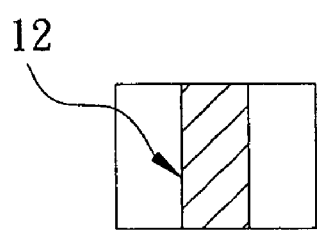
Figure 2:
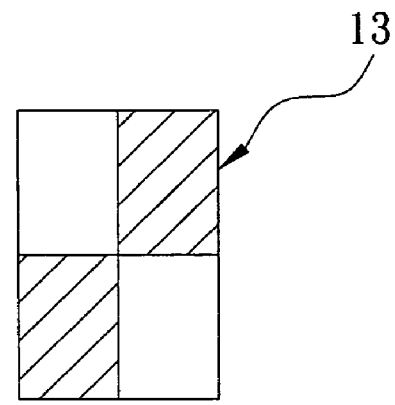
Figure 3:
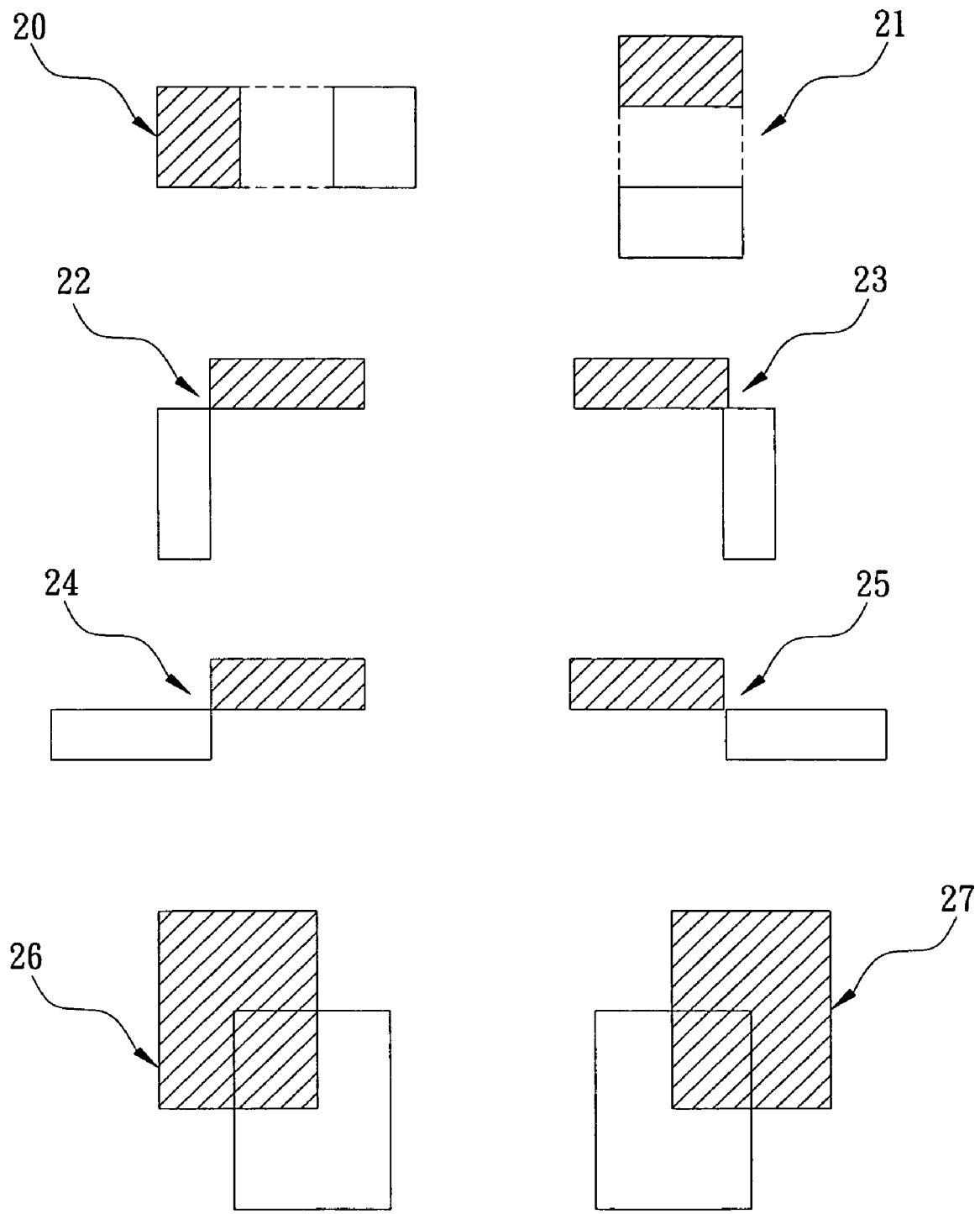
FIG. 3 is a schematic view of eight basic units used for defining feature prototypes used in the inventor's related patent applications.
Figure 4:
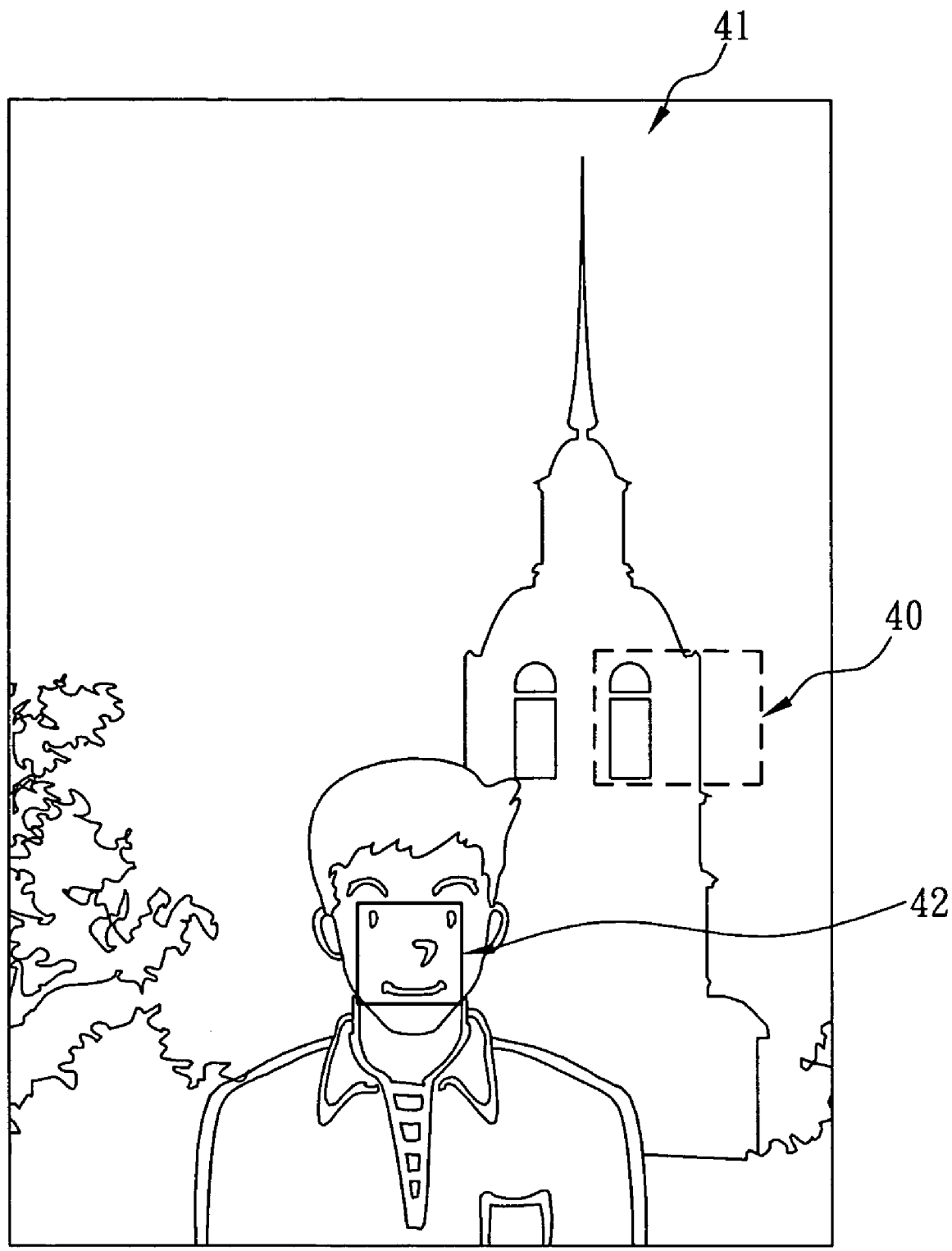
FIG. 4 is a schematic view of relative positions of a searching window and a boundary box on a preview image.

The present invention discloses a known face guided imaging method, and the method is applied for an electronic imaging device, such that if the electronic imaging device is switched to a preview state, a detection and tracking module embedded in the electronic imaging device will be used to define a plurality of searching windows 40 in different scales as shown in FIG. 4 for adjusting the scale of the searching windows 40 one by one and moving the searching window in the whole preview image 41 horizontally and vertically to search a face repeatedly. As long as a face is searched as shown in FIG. 4, its position and scale are labeled by a boundary box 42. If the face (or a front side) of the preview image 41 is moved, the detection and tracking module will perform a tracking to the face synchronously to update the position and scale of the boundary box 42, so as to accurately position the correct position of the face in the preview image 41 and achieve the correct auto focus and auto exposure of the electronic imaging device. Further, the white balance and color transfer of the preview image 41 can be adjusted correctly by the face image.

Figure 5:
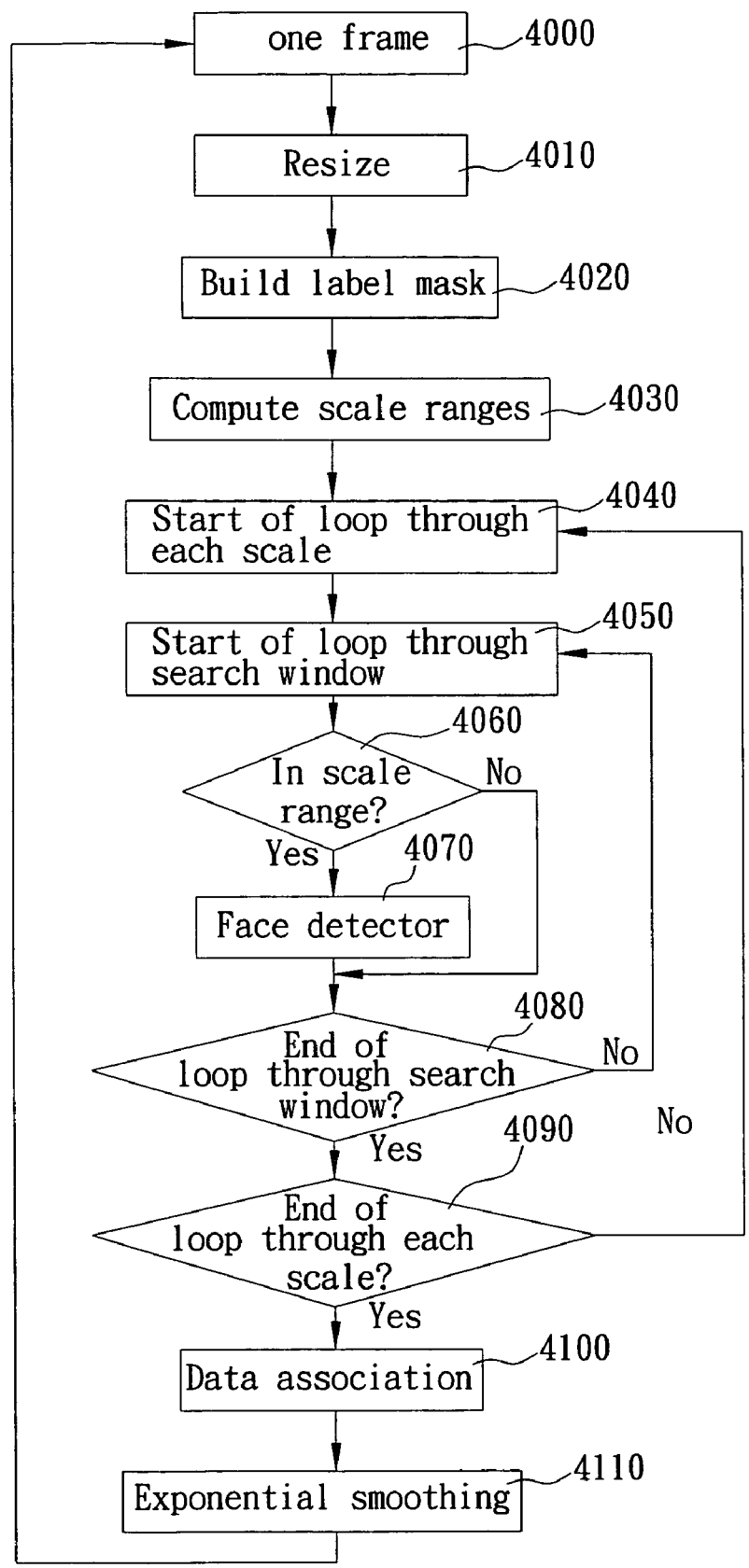
FIG. 5 is a flow chart of a preferred embodiment of the present invention.

In FIG. 4, the present invention adds a scale constraint to the searching window 40 to expedite the search and detection speed, when the searching window 40 searches a face for a preview image 41 horizontally and vertically, and the method bases on the scale of a sensed known face of the previous frame to define the scale range of the searching window 40, and just sends an image patch corresponding to the scale range in the current frame to a face detector when a face searching loop is performed horizontally and vertically to the current frame for processing the face detection. Therefore, the searching space is constrained within a small group of scale ranges without the need of searching the ranges of various different scales in the whole preview image 41, and it effectively reduces the huge quantity of computing values required by the detection process, and greatly enhances the speed and efficiency for the face detection. In addition, the present invention bases on a face classifier built by the Adaboost algorithm to control the discrimination ability of the face easily by a number of layers of a cascaded structure of the face classifier. The present invention bases on the foregoing Adaboost algorithm to train a face classifier having ten layers, such that after a series of face samples are classified, the false alarm rate of the face classifier is very low and most suitable for detecting unknown faces in an image. If factors including pose, expression and illumination are taken into consideration, the face classifier having seven layers trained by the present invention performs detections and tracking for the known faces detected in the previous frame according to the following procedure and as shown in FIG. 5. In the current frame, the known faces detected in the previous frame are detected and tracked. The detection and tracking procedure comprises the following steps:

(4000) Capture a preview image.

Figure 6:
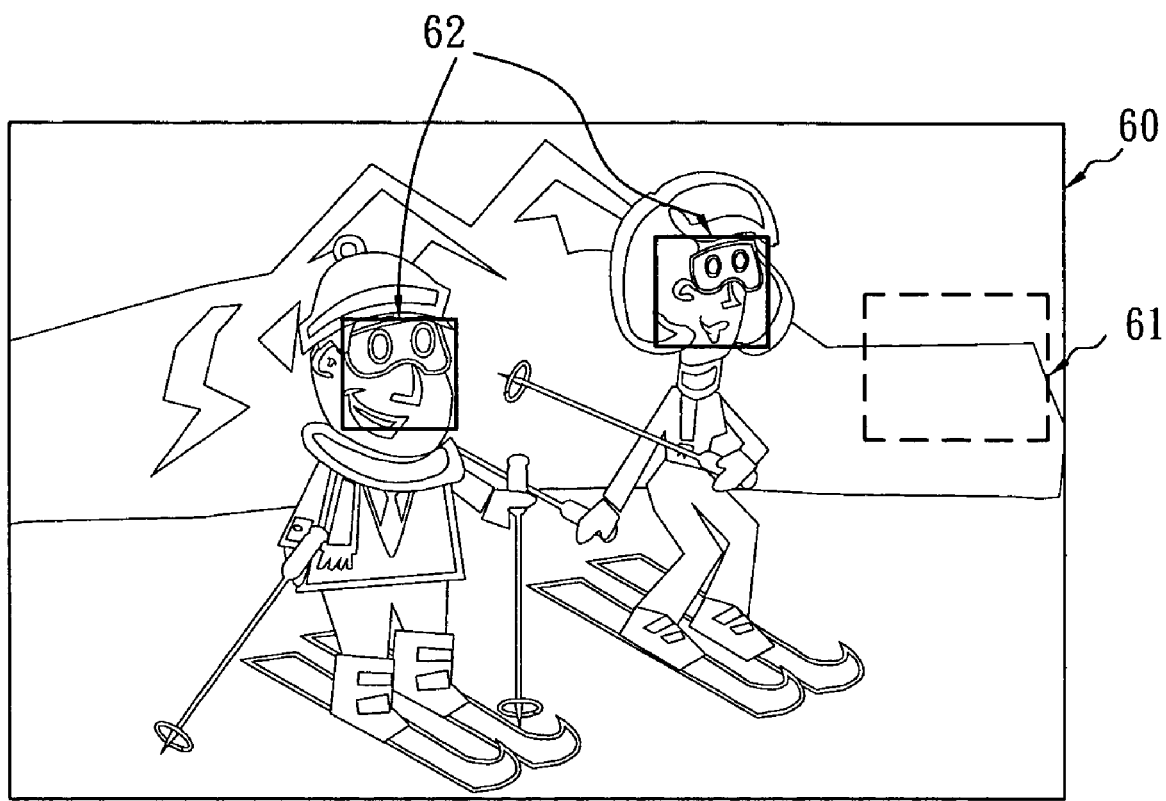
FIG. 6 is a schematic view of two known faces existed in a preview image according to a preferred embodiment as depicted in FIG. 5.
Figure 7:
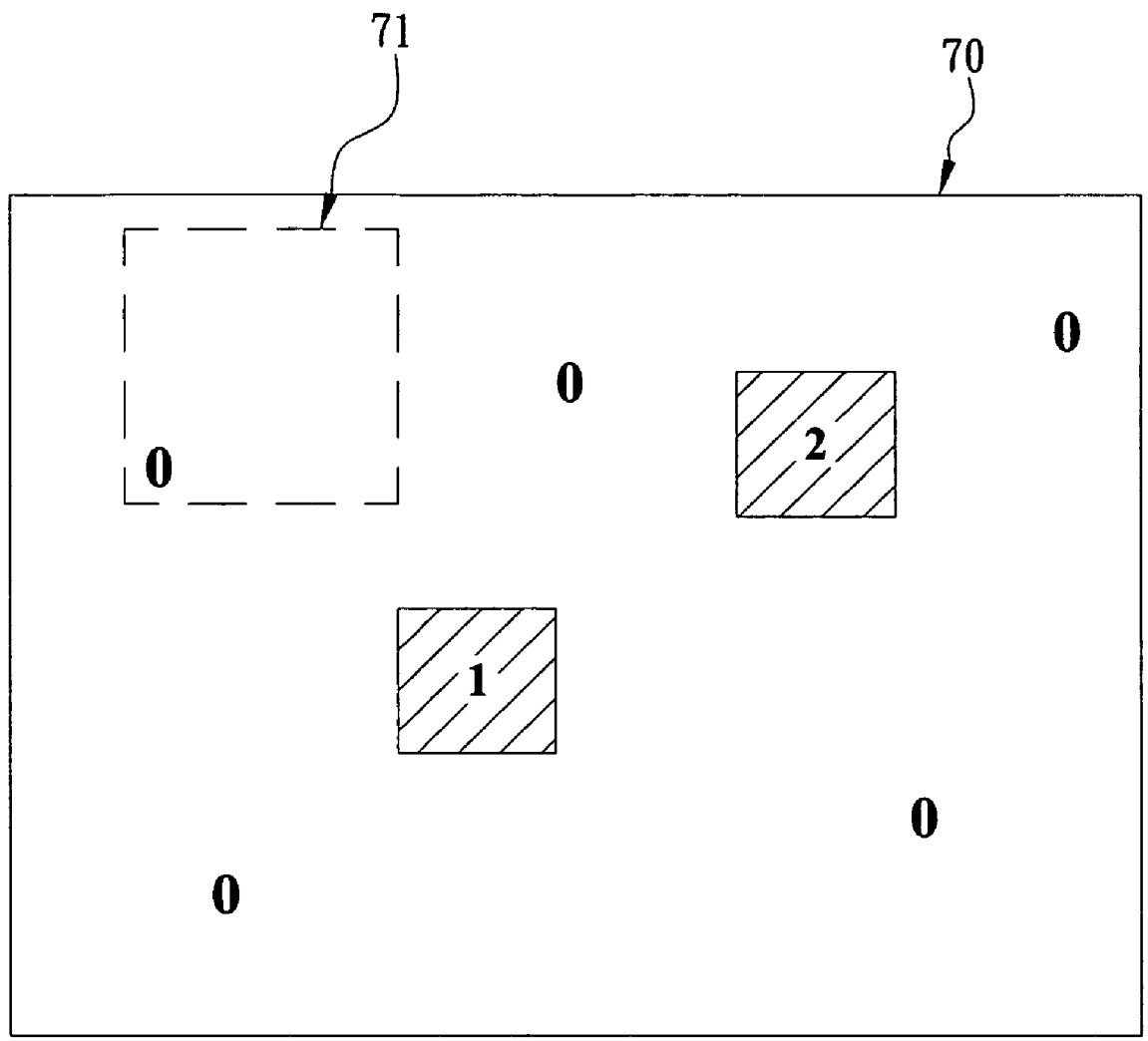
FIG. 7 is a schematic view of a label mask built by a preview image as depicted in FIG. 6.

(4010) Downsize the scale of a preview image to a search image 60 of 160×120 pixels as shown in FIG. 6;

(4020) Build a label mask 70 as shown in FIGS. 6 and 7 to assist the completion of a scale constraint, and the label mask 70 has the same scale of the search image 60, and the values are 0, 1 2, and so on, the shaded square area (which is the boundary box) of the label mask 70 as shown in FIG. 7 indicates the position and scale of the known face in the previous frame, and each pixel is labeled as 1 and 2 separately, and the remaining pixels are labeled as zero to represent the portion of the unknown face, and a searching window 61 moves horizontally and vertically to search a face in the search image 60 during a detection process as shown in FIG. 6. In a preferred embodiment of the present invention, the minimum scale of the searching window 61 is a square of 20×20 pixels, and the scale will be amplified by 1.2 times for every searching loop such as 20×20, 24×24, 28.8×28.8, 34.6×34.6, and so one. If the center of the searching window 61 falls in an area labeled as 0 which is equivalent to the position 71 as shown in FIG. 7, then a scale constraint for the unknown face will be added. If the center of the searching window 61 falls in an area labeled as non-zero, then a scale constraint of the known face will be applied;

(4030) Compute the scale ranges of the searching window 61, and the scale range defines a scale constraint of the searching window according to the range and positions of the pixels of each known face and unknown face on the label mask 70. In a preferred embodiment of the present invention, the scale range for a known face is defined as:

$$\Re = \lfloor x/(s)^2, x^*(s)^2 \rfloor \quad (3)$$

Where, x=l/20, and 20 is the width (number of pixels) of the minimum scale of a searching window 61 and s is a scale factor, and if s=1.2, then the scale of the searching window 61 is amplified by 1.2 times for every searching loop, such as 20×20, 24×24, 28.8×28.8, 34.6×34.6, and so on, when the face detector searches a face in an image, and l is the width (number of pixels) of a boundary box of the known face in the previous frame. If the width l of the boundary box of the known face in the previous frame is equal to 40, then the scale range of the searching window 61 will be adjusted to $\Re$=[1.39, 2.88] according to Equation 3, or when the face detector searches the known face in the current frame, the scale of the searching window 61 will use 20×20 as a base to adjust the scale in a range from 1.39 times to 2.88 times, and the scale will be amplified by 1.2 times for every searching loop, and thus only a searching window 61 with a scale falling within the range from 28.8×28.8 pixels to 49.8×49.8 pixels is searched for each known face in the current frame. As to the unknown face in the current image, the scale range of the searching window 61 is defined by the following two methods:

(a) If there is no known face in the current frame, then the scale range of the searching window 61 is defined as:

$$\Re = [1,6] \quad (4)$$

In other words, the scale of the searching window 61 can be adjusted within the range of $\Re$=[1,6], such that if the face detector searches a face in the current frame, the scale of the searching window 61 uses 20×20 as a base to adjust the scale within the range of being amplified from 1 time to 6 times, and the scale is increased by 1.2 times for every searching loop, including the ten scales of the searching windows 61 such as 20×20, 24×24, 28.8×28.8, 34.6×34.6, 41.5×41.5, 49.8×49.8, 59.7×59.7, 71.7×71.7, 86×86, and 103.2×103.2 pixels, so as to search a face in the image one by one. In other words, the searching windows 61 of all scales must be checked.

(b) if the current frame has known faces, the scale range of the searching window 61 is defined as:

$$\Re = \lfloor x_{max}/(s)^4, 6 \rfloor \quad (5)$$

where, $x_{max} = l_{max}/20$, as shown in FIG. 6, and $l_{max}$ is the maximum width (number of pixels) of the boundary box 62 of a plurality of known faces, so that if the maximum width $l_{max}$ of the boundary box 62 of a plurality of known faces in the previous frame is 60 pixels, then the scale of the searching window 61 can be adjusted within the range of $\Re=[1.45, 6]$ according to Equation 5. In other words, when the face detector searches a plurality of known faces in the current frame, the scale of the searching window 61 uses 20×20 as a base to adjust the scale in the range from 1.45 times to 6 times and the scale is increased by 1.2 times for every searching loop, and thus it only requires to search the plurality of known faces in the current frame by using the searching windows 61 of seven scales such as 34.6×34.6, 41.5×41.5, 49.8×49.8, 59.7×59.7, 71.7×71.7, 86×86, 103.2×103.2 pixels one by one. Therefore, if the face detector detects a new face in the current frame, the scale of the searching window 61 of the searched new face should not be less than $x_{max}/(s)^4$.

(4040) Select a scale according to the computed scale range.

(4050) Set the scale of the searching window 61 according to the selected scale as shown in FIG. 6, and let the searching window 61 move horizontally and vertically on the whole search image 60 to search a known face or an unknown face.

(4060) Determine whether or not the center of the searching window 61 falls within an area labeled as 0 on the label mask 70 as shown in FIGS. 6 and 7; if yes, then adopt the scale constraint of unknown face, and continue Step (4070); or determine whether or not the center of the searching window falls in an area labeled as non-zero; if yes, then adopt the scale constraint of the known face, and continue Step (4070); or else continue Step (4080).

(4070) Send an image patch corresponding to the scale range of the current frame to the face detector to perform a face detection.

(4080) Determine whether or not the searching window 61 has searched the whole search image 60 horizontally and vertically to the utmost rear end; if yes, then continue Step (4090); or else, continue Step (4050).

(4090) Determine whether or not all scales in the scale range have been selected and used; if yes, continue Step (4100); or else continue Step (4040), and select the next scale according to the computed scale range.

(4100) Use an overlapping method to build an association between a newly detected known face in the current frame and a detected known face in the previous frame; and build an association between the detected known faces before and after the detection by defining a searching area around the old position in the known face in the previous frame, and the searching area is a bounding rectangle of the known face. In the searching area, the position having the most overlapped portion with the known face is considered as a new position of the known face; and if no face is detected, then the originally detected known face will be deleted.

(4110) In the present invention, the position and scale of the detected face is labeled in a boundary box 62 as shown in FIG. 6, and the boundary box 62 updates each image according to the detected result of the face detector, and thus the scale of the boundary box 62 is always not a constant, and the present invention uses an exponential smoothing method to make a smoother change to the scale of the boundary box 62 or uses a double exponential smoothing method to make a tendentious change to the boundary box. In this preferred embodiment, if the width $y_i$ of a detected face in an image i is computed according to the double exponential smoothing, and its smoothed width $S_i$ is defined as:

$$S_i = \alpha y_i + (1-\alpha)(S_{i-1} + b_{i-1}) \quad (6)$$

$$b_i = \gamma(S_i - S_{i-1}) + (1-\gamma)b_{i-1} \quad (7)$$

where $0 \leq \alpha \leq 1$, $0 \leq \gamma \leq 1$ and $b_i$ is used for computing a changing tendency in an image, and $\alpha$ and $\gamma$ are constants. The preferred embodiment sets $\alpha$ and $\gamma$ to be 0.3 and 0.7 respectively, and $S_i$ and $b_i$ in each image are updated with observations, and the initial value $S_i$ is generally set to $y_i$, and $b_i$ is initialized by the following equation:

$$b_i = y_2 - b_1 \quad (9)$$

It is noteworthy to mention that the equation used for computing the scale range of the searching window to build an association of the detected known faces and change the scale of the boundary box by a smoothing method is disclosed in a preferred embodiment, but it is not intended to limit the invention. For the ordinary persons skilled in the art can make modifications, such as using the scale (or the scale of the boundary box) of the sensed known face in the previous frame to constrain the scale of the searching space, such that the scale of the searching space is constrained in a small group of scale ranges, and modifications of this sort are included in the claims of the present invention.

Therefore, the present invention uses the searching windows to perform a face searching loop horizontally and vertically for the current frame, and the searching space is constrained in a small group of scale ranges according to the scale of the sensed known face in the previous frame, without the need of detecting the search range of various scales in the whole search image. The invention not only effectively reduces the huge quantity of computing values required for the detection process and greatly enhances the speed and efficiency of the face detection, such that the electronic imaging device can quickly and accurately position the correct position of a face in the preview image, and quickly and accurately achieve the advanced functions such as the auto focus and auto exposure for taking high-quality images.

While the invention herein disclosed has been described by means of specific embodiments, numerous modifications and variations could be made thereto by those skilled in the art without departing from the scope and spirit of the invention set forth in the claims.

What is claimed is:

1. A known face guided imaging method, applied to an electronic imaging device, comprising the steps of:
    defining at least one scale constraint of a searching window based on a scale of a boundary box of a sensed known face of a previous frame, and said scale constraint is a scale range of said searching window;
    searching a face horizontally and vertically in a current frame based on said searching window within said scale range; and
    sending an image patch within said scale range in said current frame to a face detector to perform a face detection;
    building a label mask with the same scale constraint as said current frame, and labeling an area corresponding to said boundary box of sensed known face in said previous frame and other area corresponding to the remaining unknown faces with different values; and if the center of said searching window falls in said area corresponding to said boundary box labeled as having said sensed known face during the face detection, then said scale constraint of said sensed known face will be applied; and when there is only one sensed known face in said current frame, said scale range of said searching window is defined as:

$$R=[x/(s)^2, x*(s)^2],$$

wherein x=l/b, and l is the number of pixels of the width of said boundary box of said sensed known face in said previous frame; b is the number of pixels of the width of said searching window with a minimum scale; and s is a scale factor.

2. The method of claim 1 wherein, when there are a plurality of sensed known faces in said current frame, said scale range of said searching window is defined as:

$$\mathfrak{R}=\lfloor x_{max}/(s)^4, L/s \rfloor$$

wherein $x_{max}=l_{max}/b$, and $l_{max}$ is a number of pixels of the width of the largest boundary box of a plurality of known faces in said previous frame; b is a number of pixels of the width of a searching window having a minimum scale, and s is a scale factor.

3. The method of claims 1 wherein, when no known face exists in said current frame, said scale range of said searching window is defined as:

$$\mathfrak{R}=[1, L/b]$$

wherein L refers to the number of pixels of the width of said current frame.

4. The method of claims 2 wherein, when no known face exists in said current frame, said scale range of said searching window is defined as:

$$\mathfrak{R}=[1, L/b]$$

wherein L refers to the number of pixels of the width of said current frame.

5. The method of claims 1, further comprising the steps of:
defining a searching area around an old position of said sensed known face in said previous frame, and said searching area is a boundary rectangle of said known face;
considering the largest face overlapped portion of a newly detected known face and said sensed known face in said previous frame in said searching area as a new position of said sensed known face; and
updating the position of said boundary box of said sensed known face in said current frame.

6. The method of claims 2, further comprising the steps of:
defining a searching area around an old position of said sensed known face in said previous frame, and said searching area is a boundary rectangle of said known face;
considering the largest face overlapped portion of a newly detected known face and said sensed known face in said previous frame in said searching area as a new position of said sensed known face; and
updating the position of said boundary box of said sensed known face in said current frame.

7. The method of claim 5, further comprising a step of:
making a smooth change for the scale of said new and old boundary boxes by using an exponential smoothing method.

8. The method of claim 6, further comprising a step of:
making a smooth change for the scale of said new and old boundary boxes by using an exponential smoothing method.

9. The method of claim 5, further comprising a step of:
making a tendentious change for said new and old boundary boxes by using a double exponential smoothing method.

10. The method of claim 6, further comprising a step of:
making a tendentious change for said new and old boundary boxes by using a double exponential smoothing method.

* * * * *